UNITED STATES PATENT OFFICE.

RAYMOND F. BACON, OF PITTSBURGH, PENNSYLVANIA, ASSIGNOR TO METALS RECOVERY COMPANY, OF NEW YORK, N. Y., A CORPORATION OF MAINE.

SULFIDATION AND FLOTATION OF ORES.

1,312,668. Specification of Letters Patent. Patented Aug. 12, 1919.

No Drawing. Application filed March 6, 1917. Serial No. 152,758.

*To all whom it may concern:*

Be it known that I, RAYMOND F. BACON, a citizen of the United States, residing at No. 4909 Forbes street, in the city of Pittsburgh, county of Allegheny, State of Pennsylvania, have invented certain new and useful Improvements in Sulfidation and Flotation of Ores; and I do hereby declare the following to be a full, clear, and exact description of the invention, such as will enable others skilled in the art to which it appertains to make and use the same.

This invention relates to the production of sulfidizing agents and to the sulfidation of ores therewith together with the recovery of the sulfidized ore constituents by flotation.

It has been heretofore proposed to effect the flotation and separation of oxidized ores (such as copper oxid and copper carbonate ores, etc.) from the gangue with which they are associated by first converting the oxidized ores in a finely divided condition, wholly or superficially, into sulfid, by the action of a soluble sulfid, and then subjecting the ore to any of the familiar processes for effecting the separation of sulfids from gangue by flotation.

The localities in which flotation processes are practised are frequently remote from manufacturing and distributing centers, and, for this and other reasons, it is of importance to provide an economical and feasible source of supply of the soluble sulfids required and to provide for the utilization of such soluble sulfid in an economical and advantageous manner. The present invention is designed particularly to meet such requirements, and to provide for the production and utilization of the soluble sulfid at the flotation plant, which is usually situated in the mining region.

The present invention involves the production of soluble alkaline sulfids for the sulfidizing operation from materials which are usually present in cheap and available form in the localities where mining operations are being carried on. The invention involves also the sulfidation of oxidized ores with the alkaline sulfids thus produced and the recovery of the thus sulfidized ores by a flotation operation. The operation of producing the soluble alkaline sulfids desired, as well as the operation of utilizing these soluble sulfids in the sulfidation of oxidized ores, is, in the present instance, one of notable economy and simplicity.

In the production of the alkaline sulfid or sulfids according to the present invention, I may make use of the natural alkali and alkaline earth materials available in mining regions such as lime, and the hydroxids, carbonates and borates of the alkali or alkaline earth metals. With this cheap source of alkali, I may associate insoluble metal sulfids, such as sulfid ores or concentrates, as, for instance, iron pyrites, copper pyrites, flotation concentrates and the like, thereby obtaining a convenient and economical source of sulfur.

An appropriate quantity of any one or more of the group of alkali sources is then mixed with an appropriate quantity of any one or more of the sulfur sources. The ingredients of the mixture are preferably reduced to a fine state of subdivision so as to obtain a correspondingly intimate intermingling of the particles, and are charged into an externally heated retort or muffle.

In the retort or muffle, or prior to their introduction therein, the ingredients are subjected, in the first instance, to a temperature lower than the heat of reaction at which the soluble sulfid is produced, for the purpose of driving off any moisture contained in the charge and also for the purpose of driving off any water of crystallization present. Thereafter, the mixture is raised to a red heat (600° C. to 700° C.) in a reducing or other non-oxidizing atmosphere, whereupon they will react to form the soluble sulfid desired. If the preliminary expulsion of the moisture and water of crystallization is carried out in the muffle or retort itself, as preferred, provision should be made for removing the water vapor before the sulfid reaction temperature is reached, as will be readily understood.

When the insoluble metallic sulfids (sulfid ores or concentrates) are treated with the alkaline material at the proper temperature in the manner described, there is formed a metallic oxid and an alkaline sulfid.

In the sulfidation of ores, prior to their flotation, only a superficial coating of sulfid is necessary for flotation purposes. The alkaline sulfid produced is accordingly sufficient to form or coat a much larger amount of oxidized ore constituents than the amount from which the alkaline sulfid was produced.

The soluble alkaline sulfid produced in the manner described is, according to the present invention, utilized for the sulfidation of oxidized ores by introducing the material containing the soluble sulfid directly into the water of the sulfidizing tank in appropriate amount, whereupon the soluble sulfid is taken into solution by the sulfidizing water *in situ*. Since this material contains the ore constituents which furnish the sulfur for the alkaline sulfid, these constituents will in turn be again subjected to the action of the soluble sulfid when it is taken into solution in the sulfidizing tank. Such constituents are, however, practically insoluble and, as only a superficial coating of sulfid is necessary for flotation processes, there is present sufficient soluble sulfid to coat the metallic oxid introduced with the soluble sulfid and also a very considerable quantity of other oxidized ore constituents; so that there can be recovered during the subsequent flotation operation the sulfidized ore constituents to which the soluble sulfid was added as well as similar constituents resulting from the sulfidation of the ore constituents accompanying the soluble sulfid.

In the absence of excess of acid, the whole solution in which the reaction takes place will be alkaline and all the oxidized ore constituents will tend to become sulfidized, so that they will be floated. In case, however, that there is a considerable quantity of iron sulfids in the ore or concentrates used, or of iron oxids in the ore to be sulfidized, and in case it is desirable to prevent separation of such iron ore constituents, then the alkaline sulfid may be made acid, either before or after adding to the main charge of oxidized ore pulp to be sulfidized.

The furnace product containing the alkaline sulfid can be first extracted with water before adding to the main charge of ore to be sulfidized, and this extraction with water may be carried on also with added acid to give an acid reaction. In this case, when the solution still containing the accompanying ore constituents of the furnace product is added to the main charge of oxidized ore material to be sulfidized, a similar composite result will be obtained, as when the extraction takes place in the presence of the ore to be sulfidized. Since certain sulfids such as iron sulfid are soluble in acids, their formation is precluded by the presence of a suitable excess of acid. In this case the soluble sulfid will act to sulfidize ore constituents which form insoluble sulfids in the presence of acids. In this way a selective sulfidation can be effected with the formation of such sulfidized ore constituents as form insoluble sulfids in the presence of acids. The thus sulfidized ore constituents can thus be separated by a flotation operation and without the separation of such constituents as have not become sulfidized. By the addition of further amounts of alkaline sulfid bearing material to the ore pulp after such flotation treatment and by keeping the liquor alkaline, a further sulfidation can be effected of ore constituents which form insoluble sulfids in the presence of alkalis, for example, iron sulfid or zinc sulfid; and such sulfids can in turn be recovered by another flotation operation.

Accordingly, according to the present invention, the soluble sulfid can be used either in an alkaline or an acid medium, for effecting sulfidation, or first in an acid and then in an alkaline medium, with corresponding sulfidation of all or of a part only of the oxidized ore constituents, and with a corresponding recovery by flotation of the fractionally or completely sulfidized ore constituents. Particularly when the soluble sulfid is produced from iron sulfid and alkalis or where the ore to be sulfidized contains considerable quantities of iron oxid, the carrying out of the sulfidation in an acid medium prevents sulfidation of the iron and results in the sulfidation of a correspondingly greater amount of more valuable ore constituents and the production of a correspondingly higher grade concentrate.

With certain ores containing both lead and zinc in an oxidized state, the utilization of the alkaline sulfid material in the presence of an excess of acid will enable the lead to be first sulfidized so that it can be separately floated; while the zinc can be recovered subsequently by sulfidation in an alkaline medium and by subjecting the sulfidized ore to another flotation operation.

It will be seen that, according to the present invention, the soluble sulfid is utilized directly in the flotation art, without first recovering the sulfid in a solid form from the finished charge of the furnace operation, and even without separation of the soluble sulfid or its solution from the accompanying metalliferous constituents; while the direct utilization of the soluble sulfid with its accompanying metalliferous constituents makes it possible to recover part or all of such metalliferous constituents at the same time that there is recovered the main ore concentrate during the main flotation operation.

The oxidized ore may be in the form of an ore pulp with the oxidized constituents in suspension, or in partial or complete solution in water or acid, or in other suitable finely divided condition.

A characteristic advantage of the invention is, as hereinbefore indicated, that from materials readily available at the mine or at the flotation plant, the operator is enabled cheaply and conveniently to produce a sulfidizing material which is utilizable as such for the sulfidation of the oxidized ore to be separated by flotation, without undergoing the expense of obtaining the soluble sulfid from distant points and without being obliged to recover it in a solid form or in an isolated form from the product of the furnace operation. It is a further characteristic advantage of the invention, also heretofore indicated, that the utilization of such furnace product containing the soluble sulfid makes it possible to recover as well the sulfidizable constituents of such material as well as the sulfidizable constituents of the oxidized ore which is treated.

What I claim is:

1. In the art of mineral separation, the method of rendering oxidized ores amenable to flotation, which comprises heating a mixture of sulfid minerals containing metalliferous values to be recovered and alkaline material to a temperature sufficient to form a water soluble sulfid, and subjecting the oxidized ores to a flotation operation in the presence of the resulting sulfid containing material.

2. In the art of mineral separation, the method of rendering oxidized ores amenable to flotation, which comprises heating a mixture of sulfid minerals containing metalliferous values to be recovered and alkaline material to a temperature sufficient to form a water soluble sulfid, extracting the soluble sulfid and subjecting oxidized ores, together with undissolved constituents of the treated mixture to a flotation operation in the presence of the resulting solution and thereby effecting the sulfidation and separation of the oxidized ore.

3. In the art of mineral separation, the method of rendering oxidized ores amenable to flotation, which comprises heating a mixture of sulfid minerals containing metalliferous values to be recovered and alkaline material to a temperature sufficient to form a water soluble sulfid, extracting the soluble sulfid and utilizing the resulting solution for effecting the sulfidation of the oxidized ore by adding the sulfid containing material, including the oxidized constituents to the oxidized ore, dissolving the soluble sulfid and subjecting the mass to a flotation operation.

4. The method of recovering oxidized ores by flotation, which comprises adding to the oxidized ores a sulfidizing agent comprising soluble sulfids and insoluble ore constituents, and subjecting the resulting sulfidized ore to a flotation operation and thereby recovering the sulfidized constituents from the ore and from the sulfidizing agent; substantially as described.

5. In the art of mineral separation, the method of rendering oxidized ores amenable to flotation and of concentrating such ores by flotation, which comprises forming a sulfidizing agent containing a water soluble sulfid from sulfid minerals and an alkaline material, adding such sulfidizing agent to the oxidized ore and thereby effecting sulfidation of the same, and subjecting the sulfidized ore to flotation and thereby recovering the sulfidized ore constituents from the oxidized ore treated and from the sulfidizing agent; substantially as described.

In testimony whereof I affix my signature.

RAYMOND F. BACON.

Witness:
G. DEXTER POOL, Jr.